March 13, 1962 J. LÜSCHER 3,025,449
REGULATOR ARRANGEMENT FOR GENERATORS
Filed May 6, 1959 2 Sheets-Sheet 1

INVENTOR
Jakob Lüscher
BY Michael S. Striker
Attorney

Jakob Lüscher
INVENTOR

United States Patent Office 3,025,449
Patented Mar. 13, 1962

1

3,025,449
REGULATOR ARRANGEMENT FOR GENERATORS
Jakob Lüscher, Geneva, Switzerland, assignor to Robert
 Bosch G.m.b.H., Stuttgart, Germany
Filed May 6, 1959, Ser. No. 811,403
Claims priority, application Germany May 7, 1958
4 Claims. (Cl. 322—25)

The present invention refers to an automatic regulating apparatus or arrangement for shunt excited generators driven at substantially varying speeds, as for instance generators used in connection with the lighting equipment of vehicles and the like and driven by the engines of such vehicles. In particular, the invention refers to such regulating arrangements which comprise at least one power transistor which has an emitter-collector circuit connected in series with the exciter winding of the generator between the output voltage of the generator which is to be regulated. Such arrangement further comprises a second conrol arrangement which is likewise operated by the output voltage which is to be regulated and serves to control the above mentioned power transistor; this second control arrangement comprises at least one conductive means having a non-linear distinctly curved current-voltage characteristic and is therefore capable of delivering a control current for the power transistor changing more than proportionally with rising output voltage of the generator.

It is a main object of this invention to provide for generators, and particularly for generators serving the lighting equipment, comprising a storage battery, of motor vehicles and driven by the engine thereof, a regulating arrangement having a characteristic of operation resulting in that the output voltage of the generator is maintained at a substantially constant value while the output current increases up to a value predetermined by the type of the generator, while, on the other hand, the output voltage is substantially reduced when the current furnished by the generator increases beyond the above mentioned predetermined value.

It is another object of this invention to provide a regulating arrangement as set forth, which is composed of a comparatively small number of components and is reliable in operation.

With above objects in mind, an apparatus for regulating the voltage output of a shunt generator capable of furnishing various output voltages depending upon the rotational speed thereof and upon the output current drawn from said output generator, comprises, according to the invention, in combination, power transistor means in circuit with the shunt exciter means of the generator for controlling the exciter current depending upon the conductivity condition of the transistor means; first control means in circuit with the power transistor means for causing the latter to change between conductive and non-conductive condition, and vice versa, depending upon said output voltage, said first control means comprising first conductive means having a non-linear current-voltage characteristic and being capable of causing, depending upon the prevailing output voltage of said generator, a first control current to flow from said first control means to said power transistor means in such a manner that said first control current increases more than proportionally with increasing output voltages; and second control means in circuit with said power transistor means for changing the latter between conductive and non-conductive condition, and vice versa, depending upon the current output of said generator, said second control means comprising second conductive means having a non-linear current-voltage characteristic and being capable of causing, depending upon the current output of said generator, a second control current to flow from said second control means to said power transistor means in such a manner that said second control current increases more than proportionally with increasing output current of said generator, whereby the output voltage of said generator is automatically regulated to a predetermined value irrespectively of varying rotational speeds and output currents of said generator.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
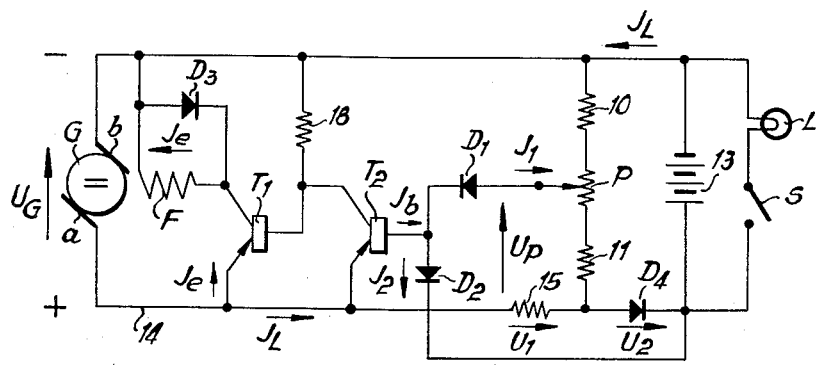
FIG. 1 is a schematic circuit diagram illustrating a preferred embodiment of a high speed regulating arrangement for vehicle lighting equipment generators.

Referring now to FIG. 1, the arrangement for regulaing the output voltage of a generator G comprises a power transistor T1 preferably of the p-n-p-type, the emitter-collector circuit whereof is connected in series with the shunt field winding F of the generator G between the positive and negative terminals $a$ and $b$, respectively, of the generator. The means for controlling the power transistor T1 comprise not only a second transistor T2, hereafter called the control transistor, but also two crystal diodes D1 and D2 and a load resistor 15 having e.g. approximately .05 ohm and connected within the main positive connecting line 14 between the terminal $a$ of the generator G and a storage battery 13, and also a crystal rectifier D4 which is so constructed that it is capable of carrying even the highest load currents $J_L$ occurring during the normal operation of the generator G. The two diodes D1 and D2 are conductive means having a non-linear current-voltage characteristic. Specifically, the diode D1 is a so-called Zener diode operated in locking condition and connected with its electrode acting as anode in the conductive direction, to an adjustable tap of a potentiometer P of e.g. 100 ohms. This potentiometer together with a resistor 10 of e.g. 30 ohms and a second resistor 11 of e.g. 100 ohms constitutes a voltage divider circuit. The other electrode of the diode D1 is connected with the base of the control transistor T2. Connected to this base is also the anode of the second diode D2 whose other electrode is connected to the positive terminal of the battery 13 forming part of the whole lighting arrangement.

The above mentioned resistance 11 i.e., the voltage divider circuit, is connected with a junction point located in the line 14 between the load resistor 15 and the already mentioned crystal rectifier D4. For the sake of completeness a lamp L which may be one of the headlights of the vehicle, and a control switch S is shown as constituting a load circuit in connection with the output of the battery 13.

The above described arrangement operates as follows:

When the rotation of the armature of the generator G which has been at a standstill is started by the engine, not shown, the generator is self-excited on account of the magnetic remanence existing in the iron parts of the generator. As soon as even a small output voltage $U_G$ apears at the terminals $a$ and $b$ an exciter current $Je$ can flow via the transistor T1 which is now conductive and through the series-connected field winding F whereby the excitation is increased to the extent that the output voltage of the generator G approaches the desired standard value of 12.6 volts.

Since the voltage divider circuit consisting of the resistors 10 and 11 and the potentiometer P is connected between the output terminals $a$ and $b$ of the generator G, and since any effect of the battery voltage is substantially eliminated by the rectifier diode D4, the control potential $U_P$ available at the tap of the potentiometer P increases with the increase of the output voltage $U_G$ of the generator G until this control potential reaches a value $Uk$. The characteristic of the diode D1 located in the emitter-base circuit of the transistor T2 is such that upon the appearance of the sepecified value $Uk$ the diode D1 although being arranged in blocking direction, is capable to carry a substantial current $Jb$ which causes the previously non-conductive transistor T2 to become conductive.

Figure 2:
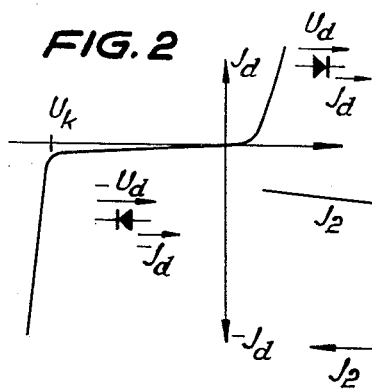
FIGS. 2–4 are graphs illustrating the function of the regulating arrangement according to FIG. 1 and of certain components thereof.

The current-voltage characteristic of the diode D1 acting as a conductive means having a non-linear current-voltage characteristic, is illustrated by FIG. 2. Actually this graph is composed of two halves, the upper right hand sector referring to the application of a positive voltage $Ud$ to the anode of this diode D1 and effecting conductivity, while the lefthand lower sector illustrates conditions when the potential $Ud$ is applied so that the diode D1 is non-conductive or blocking. Both these conditions are diagrammatically illustrated by the symbols in the above mentioned two sectors of the graph, next to the curve showing the characteristic of the diode. It can be seen that in the first mentioned case the current $Jd$ through the diode D1 increases substantially quadratically. On the other hand, as shown in the left lower quadrant of the graph, the current $Jd$ flowing through the diode D1 is shown as a function of the potential $Ud$ in the second case mentioned above. If now in this case the applied potential is smaller than the value indicated in the graph by $Uk$, i.e. below the so-called break through voltage, the blocking current $Jd$ increases only slowly and in linear proportion with the increasing potential $Ud$. As soon as, however, the applied potential $Ud$ increases beyond the value $Uk$, the diode is capable of carrying even in blocking direction a substantial and rapidly increasing current.

In order to utilize the characteristic strong bend of the characteristic at the value $Uk$, the tap of the potentiometer P is so adjusted along the potentiometer that the voltage $U_P$ reaches $Uk$ and thereby causes a strong control $Jb$ flowing through the emitter-base circuit of the control transistor U2, as soon as the generator output voltage $U_G$ increases even slightly beyond the desired standard value of 12.6 volts. The control current $Jb$ making the transistor T2 conductive in the above described manner causes a substantial current to flow across the load resistor 18 having e.g. about 200 ohms, this current causing the base potential of the transistor T1 to decrease so substantially that the latter becomes non-conductive and constitutes a great resistance for the current $Je$ flowing through the winding F of the generator G. At this moment the diode D3 connected in parallel with the field winding F becomes operative. It will be understood that at the very instant when the power transistor T1 becomes non-conductive the exciter current $Je$ flowing through the winding F cannot disappear immediately. Actually a closed-circuit current flows through the diode 3 and back to the winding F and gradually vanishes due to the existing resistances in this closed circuit. The reduction of the excitement of the generator G causes then a decrease of the output voltage $U_G$ of the generator G. Since the voltage divider circuit composed of the resistors 10 and 11 and the potentiometer P is directly connected with the output terminals $a$ and $b$ of the generator G the potential $U_P$ applied to the diode D1 is reduced to such an extent that the diode D1 is only capable to carry a very small current. This causes the control transistor T2 to become again non-conductive while the transistor T1 consequently becomes again conductive. Now the whole cycle of operation may start again and repeat.

Since the diode D1 has a strongly curved current-voltage characteristic and since, in addition, the control transistor T2 has a high amplification effect, already very small variations of the output voltage $U_G$ of the generator G, particularly variations in the order of .1 volt, are sufficient to change the transistor T1 from a condition of considerable conductivity abruptly to a condition of very small conductivity. It should be borne in mind that this power transistor operates in both cases, when it carries a high exciter current $Je$ as well as when it carries practically no current, under circumstances in which the power losses at the collector and therefore the output of heat is very small. This feature is additionally substantially enhanced by the fact that during the intervals during which the power transistor T1 is not conductive a closed-circuit current flows through the field winding F and to the diode D3. Therefore, it is possible to use for the regulation of comparatively large exciter currents $Je$, transistors of small size due to the above mentioned fact that the collector losses are comparatively small. This is particularly justified because the transistor operates in the brief transition period between non-conductive and strongly current conductive condition only for a very brief period in an area of high collector power losses, this area being passed extremely rapidly.

It can be seen that the above described regulating operation depends upon the prevailing output voltage $U_G$ of the generator G, the value of the regulated output voltage being determined by the break through voltage $Uk$ of the diode D1 so that the diode D1 serves as the element which predetermines the desired or standard output voltage. Now, according to the invention, this regulating operation is supplemented by a second regulating operation superimposed upon the first one, this second regulating operation being controlled by the prevailing charging current $J_L$ drawn from the generator G whenever this charging current exceeds a value which is the maximum permissible value in preference to the particular type or size or the generator.

Figure 3:
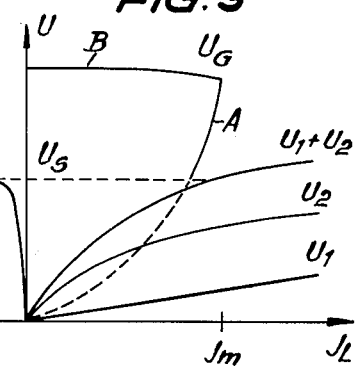
Figure 4:
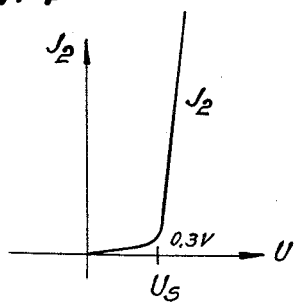
Figure 5:
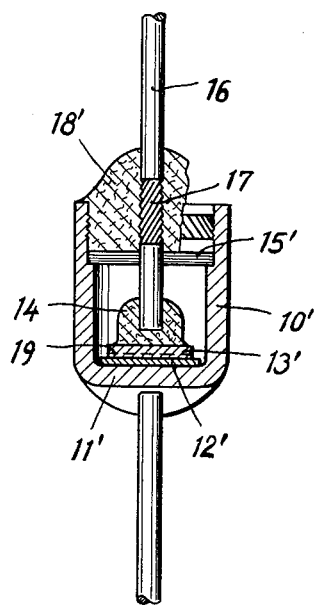
FIG. 5 illustrates a component of the arrangement.

FIG. 3 illustrates how the voltage drop U1 caused by the load current $J_L$ across the load resistor 15 and how the voltage drop U2 across the diode D4 increases with increasing output current $J_L$. It is evident that these two determine the magnitude of the current J2 flowing across the second non-linear conductor D2. The current-voltage characteristic of the diode D2 is illustrated by FIG. 4. The general type of this diode D2 is illustrated by way of example in FIG. 5. This device essentially comprises a cup-shaped element 10', a lead wire being fastened from the outside to its bottom 11', and a semi-conductor disc 13' is fastened inside the member 10' by soldering with a disc 12' of a fusible metal. The semi-conductor disc 13' may consist of n-type germanium containing approximately one foreign atom for each $10^7$ atom of germanium so that the germanium becomes n-conducting and has a specific resistivity of 0.1 ohm cm. A copper conductor 16 is soldered to that flat surface of the germanium disc 13' which is facing away from the bottom 11' of the member 10' by means of an indium dot 14. The copper conductor 16 passes through the opening of the element 10' and is electrically insulated from the latter by a disc 15' of insulating material. The conductor 16 is held in proper position by an insulating sealing plug 18' which is inserted into the opening of the member 10' and tightly surrounds the conductor 16. The indium dot 14 originally has an indium content of not less than 99.999% but during the assembly operation and application of heat the indium dot melts and at the interface between the indium dot 14 and the germanium disc 13' the melting indium dissolves a portion of the surface material of the semi-conductor disc so as to form a germanium-indium alloy in which the indium predominates. A number of indium atoms diffuse from the interface into the germanium disc to form a p-type germanium-indium alloy in which the germanium predominates and which therefore forms an n-p junction with that portion of the germanium disc in which the n-properties prevail. At the interface of the indium with the copper conductor 16 diffusion alloys of indium and copper are formed in analogous manner. The copper dissolved in the indium dot 14 partly penetrates through the liquid indium-germanium alloy and at least into the p-portion of the germanium disc 13'. The shape of the characteristic curve illustrated by FIG. 4 which makes the device sensitive to comparatively small voltage changes in the low voltage area is due to the presence of copper in the semi-conductor described above.

For the reasons stated, the diode D2 is capable of carrying a current J2 increasing rapidly as soon as a voltage is applied to its electrodes which is larger than the value $U_S$ indicated in FIG. 4 which is e.g. .3 volt and constitutes its critical value. If now the sum of the voltages $U1+U2$ appearing at the resistor 15 and at the rectifier D4, respectively, exceeds the value of the critical voltage $U_S$ the transistor T2 is rendered conductive because then the current J2 can flow from the emitter to the base of the control transistor T2 and from there across the diode D2 as a control current which is directed towards the plus terminal of the battery 13. The effect of this second control current J2 is that the transistor T2 becomes conductive practically irrespective of the prevailing output voltage $U_G$ so that in this manner the power transistor T1 is rendered non-conductive. For this reason the output voltage $U_G$ of the generator G is considerably reduced as soon as the load current $J_L$ reaches the value marked $Jm$ in FIG. 3. As can be seen, in this case it is not the control current J1 arising in the case of too high an output voltage and flowing through the first diode D1, but it is the second control current J2 flowing through the second non-linear diode D2, which plays the part or causes the control current $Jb$.

A particular advantage of the above described arrangement consists in the fact that the voltage regulation by the diode D1 is practically completely eliminated if the load current $J_L$ for any reason remains very strong in spite of a considerable decrease of the output voltage. This becomes very important particularly if for instance in the load circuits connected with the battery, or in the battery itself a short-circuit should occur. In such a case the regulating characteristic of the output voltage $U_G$ drops rapidly in the portion A (FIG. 3) so that no damages due to over-load can occur in the generator G. On the other hand, the regulation of the output voltage takes place only depending upon the prevailing values of this output voltage as long as no critical or dangerous value of the load current is reached. The effect of this feature is that the characteristic in FIGURE 3 has an almost horizontal portion B; this is evident from the fact that the output voltage $U_G$ is maintained practically exactly at the predetermined or standard value as long as the load current $J_L$ remains below a critical value.

It will be understood that each of the elements described above, or two or more together, may also find a useful application in other types of apparatus for regulating the voltage output of a generator differing from the types described above.

While the invention has been illustrated and described as embodied in an apparatus for regulating the voltage output of a shunt generator capable of furnishing various output voltages, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an apparatus for regulating the voltage output of a shunt generator capable of furnishing various output voltages depending upon the rotational speed thereof and upon the output current drawn from said generator through output lines thereof connected to a storage battery, in combination, a power transistor in circuit with the shunt exciter means of said generator for controlling the exciter current depending upon the conductivity condition of said power transistor; a control transistor the collector of which is connected with one terminal of said generator and with the base of said power transistor for causing the latter to change between conductive and non-conductive condition, and vice versa, depending upon said output voltage, the emitter of said control transistor being connected to the other terminal of said generator at a first junction point in one of the output lines of said generator, said output line comprising between said first junction point and the respective pole of said storage battery a series-combination of a resistor and a rectifier blocking any current flow from said pole of said battery through said one output line toward said generator; voltage divider means including a potentiometer connected between the other one of said output lines and a second junction point located between said resistor and said rectifier in said one output line, a Zener diode being connected between the base of said control transistor and the tap of said potentiometer, and a semi-conductor diode being connected between the base of said control transistor and said pole of said battery for permitting flow of current in direction toward said pole of said battery, whereby the output voltage of said generator is automatically regulated to a predetermined value irrespectively of varying rotational speeds and output currents of said generator up to a predetermined maximum output current, and whereby said output currents are prevented from exceeding such maximum value.

2. An apparatus as claimed in claim 1, wherein said Zener type crystal diode is arranged in the connection between the base of said control transistor means and said voltage divider means in such a manner that its blocking effect is directed against the flow of current from said base toward said voltage divider means.

3. An apparatus as claimed in claim 2, including a by-pass circuit comprising a rectifier device connected in parallel with said shunt exciter means in such a manner that when said power transistor means is rendered non-conductive a current flowing through said exciter means may circulate through said by-pass circuit, while when said power transistor means is conductive flow of current through said rectifier device is blocked thereby.

4. An apparatus as claimed in claim 1, including a by-pass circuit comprising a rectifier device connected in parallel with said shunt exciter means in such a manner that when said power transistor means is rendered non-conductive a current flowing through said exciter means may circulate through said by-pass circuit, while when said power transistor means is conductive flow of current through said rectifier device is blocked thereby.

References Cited in the file of this patent

UNITED STATES PATENTS

| | | |
|---|---|---|
| 2,809,301 | Short | Oct. 8, 1957 |
| 2,862,175 | Guyton et al. | Nov. 25, 1958 |
| 2,892,143 | Sommer | June 23, 1959 |